Patented May 1, 1923.

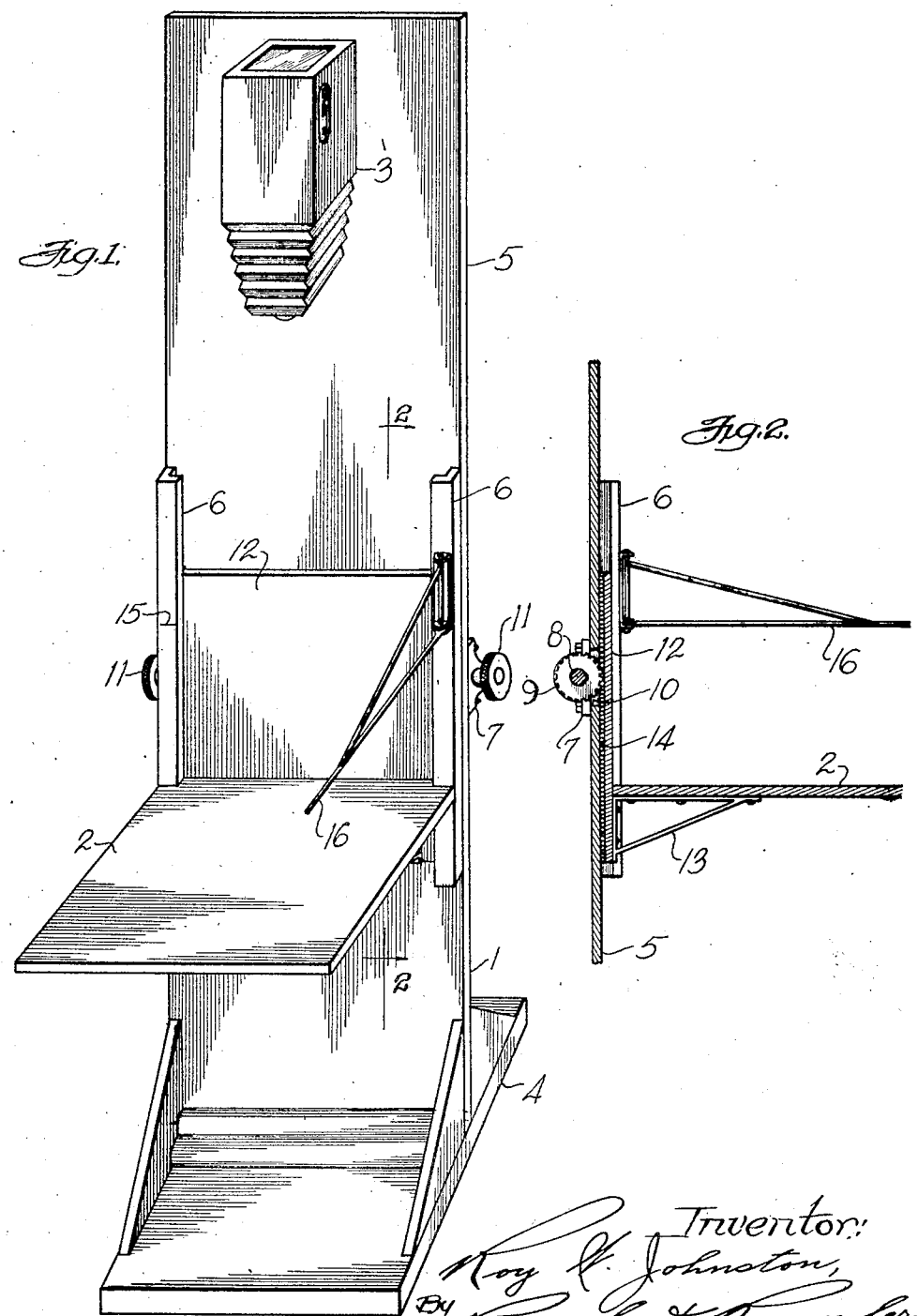

1,453,843

UNITED STATES PATENT OFFICE.

ROY W. JOHNSTON, OF CHICAGO, ILLINOIS.

FOCUSING MECHANISM.

Application filed September 22, 1921. Serial No. 502,474.

*To all whom it may concern:*

Be it known that I, ROY W. JOHNSTON, a citizen of the United States of America, and a resident of Chicago, county of Cook, and State of Illinois, have invented certain new and useful Improvements in Focusing Mechanism, of which the following is a specification.

The main objects of this invention are to provide an improved form of focusing apparatus of simple construction and operation for use in commercial photography; and more particularly to provide means for gaging the position of the object being photographed to conform to a fixed focus point with respect to the camera.

An illustrative embodiment of this invention is shown in the accompanying drawings, in which—

Figure 1 is a perspective view of the camera and focusing apparatus.

Figure 2 is a fragmentary vertical section taken on the line 2—2 of Figure 1.

In the art of commercial photography, the present method of photographing comparatively small objects involves the use of an adjustable supporting table which is mounted on an upright back so as to be vertically movable toward and away from the camera carried at the upper end of the back. To photograph an object carried on the supporting table, it is first necessary to adjust both the supporting table and also the camera so as to bring the object to the proper focus. To photograph articles of different sizes with this common form of apparatus, it is necessary to readjust the camera and supporting table for each article.

The present invention involves the use of an adjustable supporting table which is movable toward and away from a fixed or predetermined focus point located between the table and a stationary camera. The camera is adjusted so as to be permanently focused upon a predetermined focus point and, therefore, in photographing an article carried by the supporting table the only adjustment that is required is that of the table in order to bring the article into the focal plane.

In the form shown in the drawings, the apparatus comprises a standard 1, having an adjustable supporting table 2, and a stationary camera 3 mounted thereon.

The standard 1 comprises a base 4, which may be provided with the usual supporting casters (not shown) and having an upright back 5, at the upper end of which is fixed the camera 3. Secured at opposite edges of the back 1, below the camera, is a pair of vertically disposed guides 6 for slidably supporting the table 2.

Journaled in brackets 7 secured to the rear face of the back 5, is a shaft 8, on which is fixed a pair of gears 9, which project through openings 10 in the back 5 for engagement with the supporting table. Knurled heads 11 are fixed on the ends of the shaft 8, by means of which the shaft is rotated for adjusting the table.

The supporting table has an upright slide member 12, to which it is rigidly secured by brackets 13. The member 12 is vertically slidable in the guides 6 and has a pair of vertically disposed racks 14 secured to its rear face for engagement with the gears 9.

The camera 3 is adjusted so as to be permanently focused on a fixed point located within the limits of movement of the supporting table. The position of the focus point is indicated in the drawings by the line 15. Located at the focus line 15 is a gage in the form of an arm 16, which is hinged on a vertical axis to one of the guides 6, so as to be movable in the focal plane at substantially right angles to the line of vision or axis of the camera. The camera is focused so that its lateral range at the focus line 15 does not include the gage 16, when the arm occupies the position shown in Figure 1.

In operation, the object to be photographed is placed on the supporting table and the gage is swung inwardly so as to lie diagonally across the path of movement of the table. The table 2 is then adjusted by means of the shaft 8, so as to bring the highest point of the object into contact with the gage. When the supporting table has been thus adjusted, the highest point of the object will be located in the focal plane and the gage may then be swung out of the range of the camera.

Although but one specific embodiment of this invention has been herein shown and described, it will be understood that numerous details of the construction shown may be altered or omitted without departing from the spirit of this invention as defined by the following claims,

I claim:

1. A device of the class described comprising an adjustable support movable toward and away from a predetermined focus point located between said support and a camera, and a gage located at said focus point and arranged to swing in a plane at substantially right angles to the axis of the camera so as to be movable into and out of the range of the camera.

2. A device of the class described comprising an upright back having a stationary camera mounted thereon, an adjustable supporting table mounted on said back so as to be vertically movable toward and away from a predetermined focus point located between said table and camera, and a focusing gage connected to said back and arranged to swing in the focal plane.

Signed at Chicago this 20th day of Sept., 1921.

ROY W. JOHNSTON.